United States Patent
Berg

(10) Patent No.: US 11,948,476 B1
(45) Date of Patent: Apr. 2, 2024

(54) ELECTRONIC SIGN ASSEMBLY

(71) Applicant: Avi Berg, Niles, IL (US)

(72) Inventor: Avi Berg, Niles, IL (US)

( * ) Notice: Subject to any disclaimer, the term of this patent is extended or adjusted under 35 U.S.C. 154(b) by 0 days.

(21) Appl. No.: 18/131,755

(22) Filed: Apr. 6, 2023

(51) Int. Cl.
*G09G 5/10* (2006.01)
*G06F 3/02* (2006.01)
*G09F 13/00* (2006.01)
*G09F 27/00* (2006.01)
*G09G 3/20* (2006.01)

(52) U.S. Cl.
CPC .............. *G09F 13/005* (2013.01); *G06F 3/02* (2013.01); *G09F 27/007* (2013.01); *G09G 3/20* (2013.01); *G09G 2380/06* (2013.01)

(58) Field of Classification Search
None
See application file for complete search history.

(56) References Cited

U.S. PATENT DOCUMENTS

| | | |
|---|---|---|
| D680,172 S | 4/2013 | Sanders |
| 9,960,311 B1 | 5/2018 | Benezra |
| 10,672,365 B2 | 6/2020 | Hoppe |
| 10,878,730 B2 | 12/2020 | Newcomb |
| 2004/0170013 A1 | 9/2004 | Smythe |
| 2009/0298547 A1* | 12/2009 | Kim .......... G06F 1/162 455/566 |
| 2010/0229853 A1* | 9/2010 | Vandal ...... F24S 23/82 126/684 |
| 2014/0159868 A1 | 6/2014 | Sanders |
| 2020/0361497 A1* | 11/2020 | Hoppe ............ H04W 4/023 |

FOREIGN PATENT DOCUMENTS

CA 2506918 9/2006

* cited by examiner

*Primary Examiner* — Carl Adams

(57) ABSTRACT

An electronic sign assembly includes a display panel that is mountable to an exterior wall of a house and a solar panel is hingedly coupled to the display panel. A display is mounted to the display panel such that the display is visible to an individual approaching the house. The display displays indicia comprising the street address of the house to facilitate the individual to identify the address of the house. A communication unit is integrated into the display panel and the communication unit is in remote communication with a wireless communication network thereby facilitating the communication unit to communicate with a personal electronic device of a delivery driver. The communication unit actuates the display to display the indicia when the personal electronic device moves within a pre-determined delivery distance of the house.

9 Claims, 3 Drawing Sheets

ELECTRONIC SIGN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sign devices and more particularly pertains to a new sign device for displaying a street address of a building. The device includes a display panel that is mountable to an exterior wall of a building and a solar panel hingedly attached to the display panel. The device includes a display mounted to the display panel and a communication unit integrated into the display panel. The communication unit is in wireless communication with a personal electronic device carried by a delivery driver and the display is actuated when the delivery driver approaches within a pre-determined trigger distance of the building to ensure the delivery driver can clearly read the address.

(2) Description of Related Art Including Information Disclosed Under 37 CFR 1.97 and 1.98

The prior art relates to sign devices including a variety of address signs that are generally disclosed with either an electronically illuminated address sign along with a solar panel or an electronically illuminated address sign along with a solar panel and wireless communication capabilities. In no instance does the prior art disclose an address sign that includes an electronically illuminated address panel which includes a keyboard for programming an address, a solar panel hingedly attached to the electronically illuminated address panel and a wireless communication unit for turning on the electronically illuminated address panel when a delivery driver arrives within a pre-determined distance of the electronically illuminated address panel.

BRIEF SUMMARY OF THE INVENTION

An embodiment of the disclosure meets the needs presented above by generally comprising a display panel that is mountable to an exterior wall of a house and a solar panel is hingedly coupled to the display panel. A display is mounted to the display panel such that the display is visible to an individual approaching the house. The display displays indicia comprising the street address of the house to facilitate the individual to identify the address of the house. A communication unit is integrated into the display panel and the communication unit is in remote communication with a wireless communication network thereby facilitating the communication unit to communicate with a personal electronic device of a delivery driver. The communication unit actuates the display to display the indicia when the personal electronic device moves within a pre-determined delivery distance of the house.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
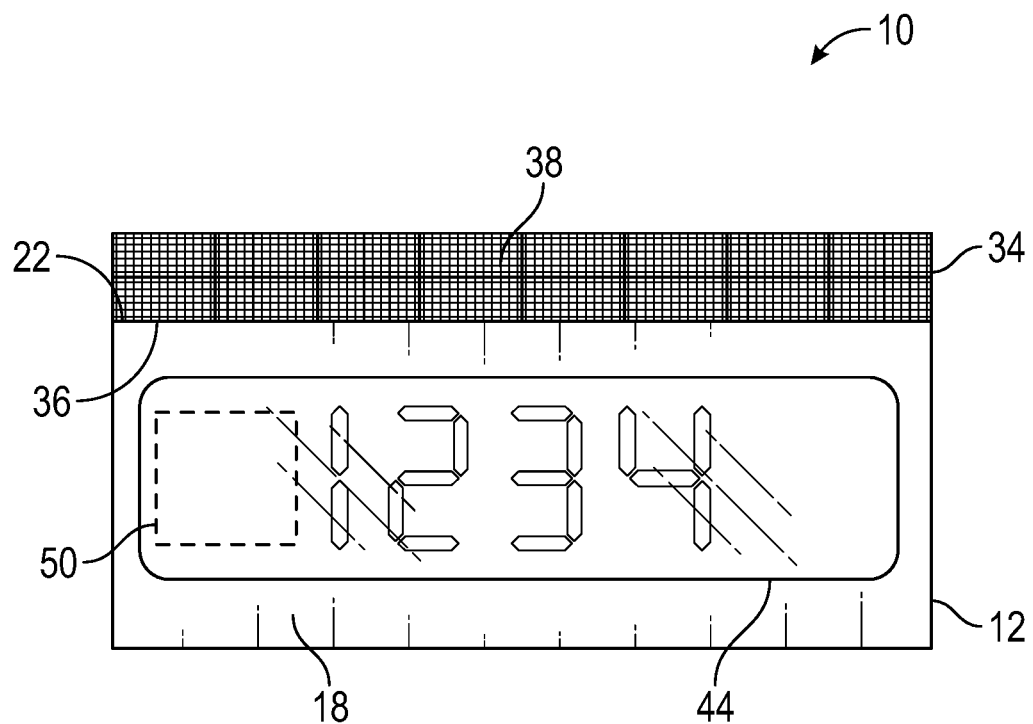
FIG. 1 is a front view of an electronic sign assembly according to an embodiment of the disclosure.
Figure 2:
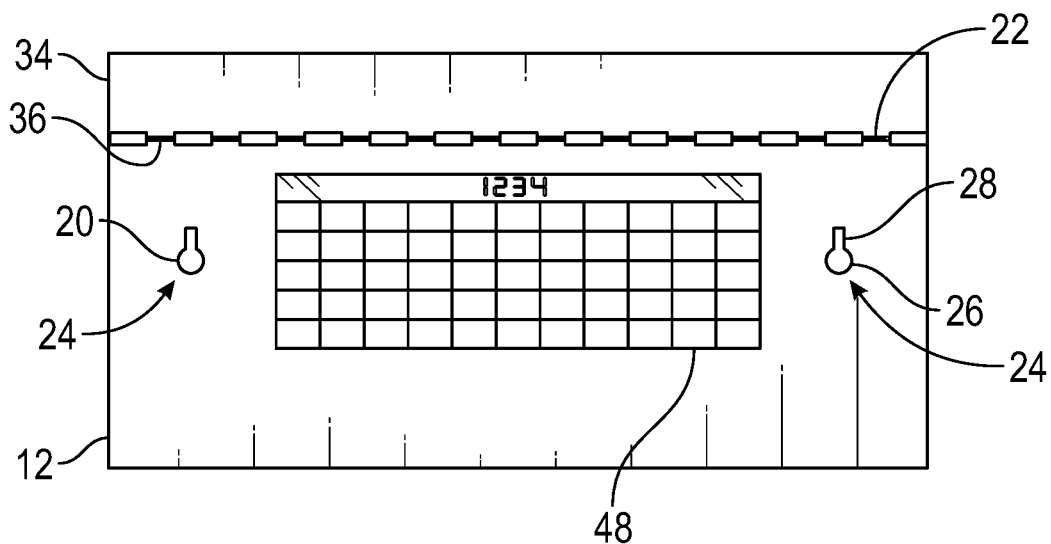
FIG. 2 is a back view of an embodiment of the disclosure.
Figure 3:
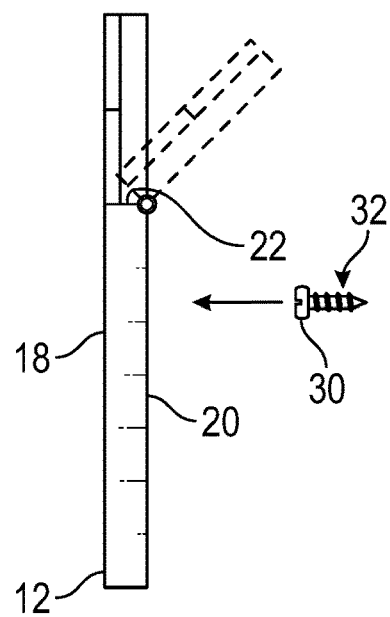
FIG. 3 is a left side view of an embodiment of the disclosure.
Figure 4:
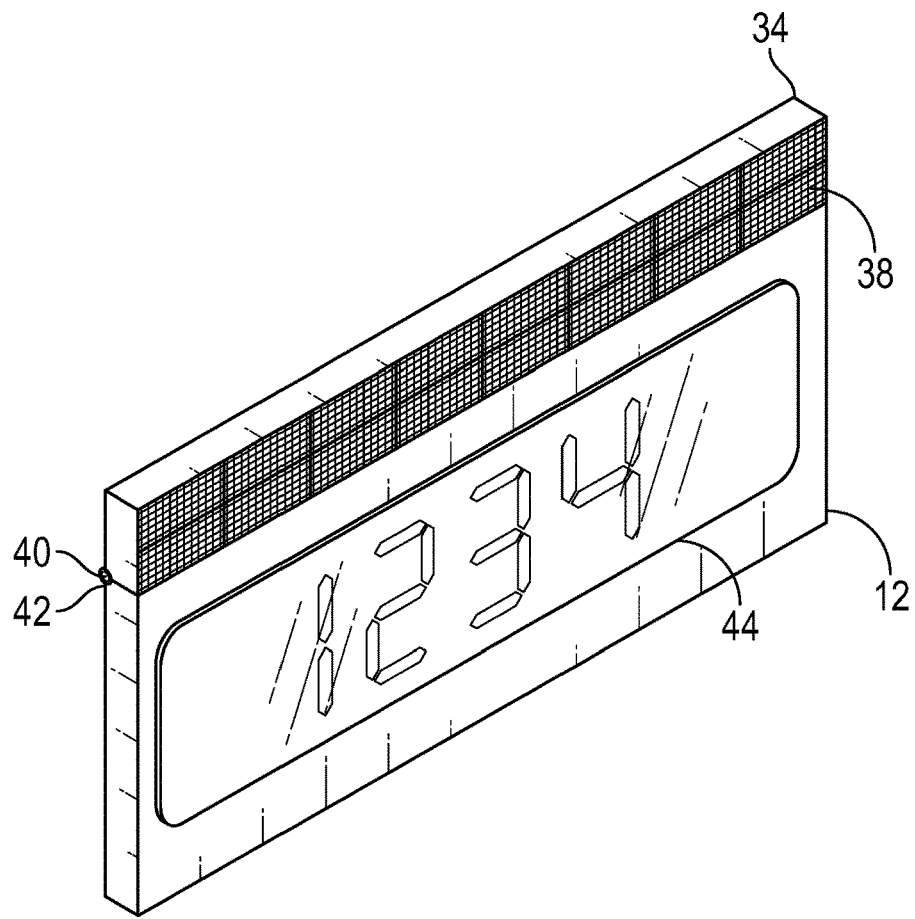
FIG. 4 is a front perspective view of an embodiment of the disclosure.
Figure 5:
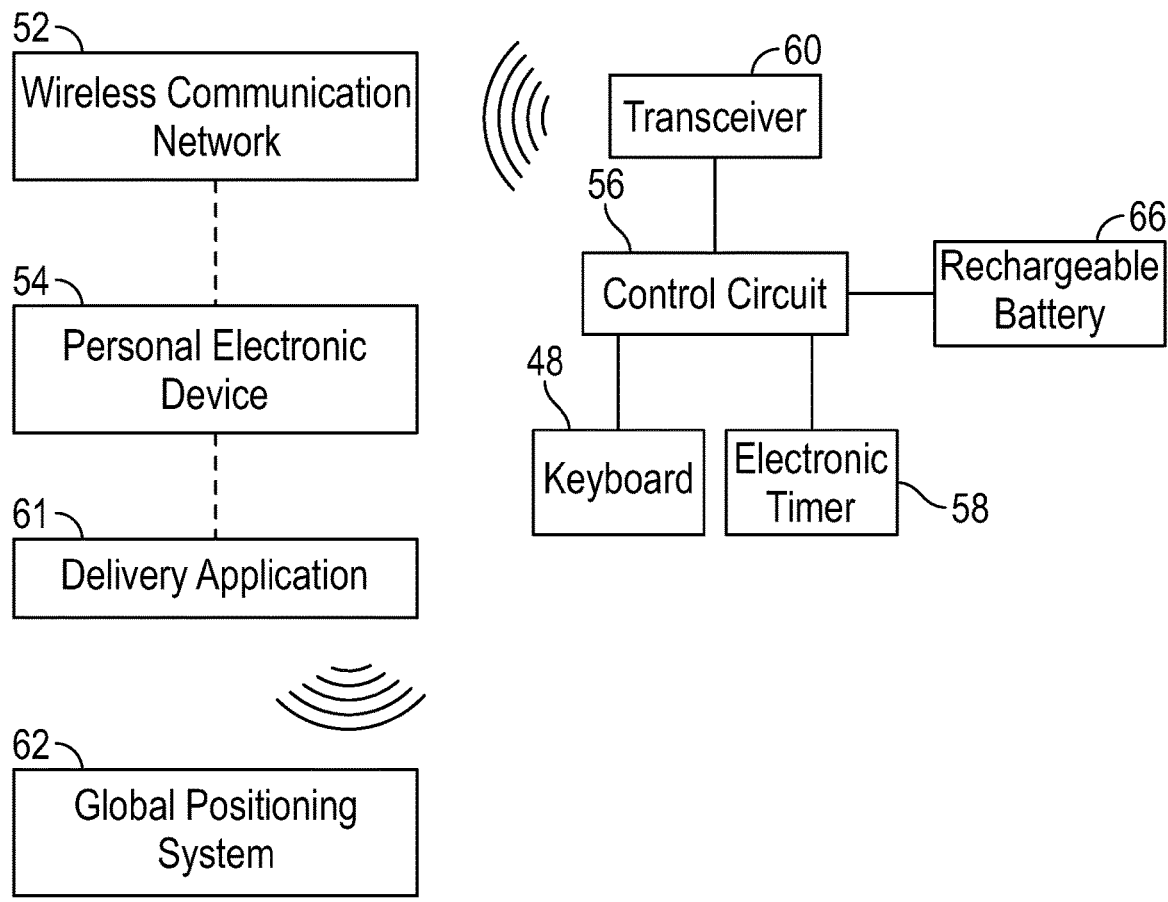
FIG. 5 is a schematic view of an embodiment of the disclosure.
Figure 6:
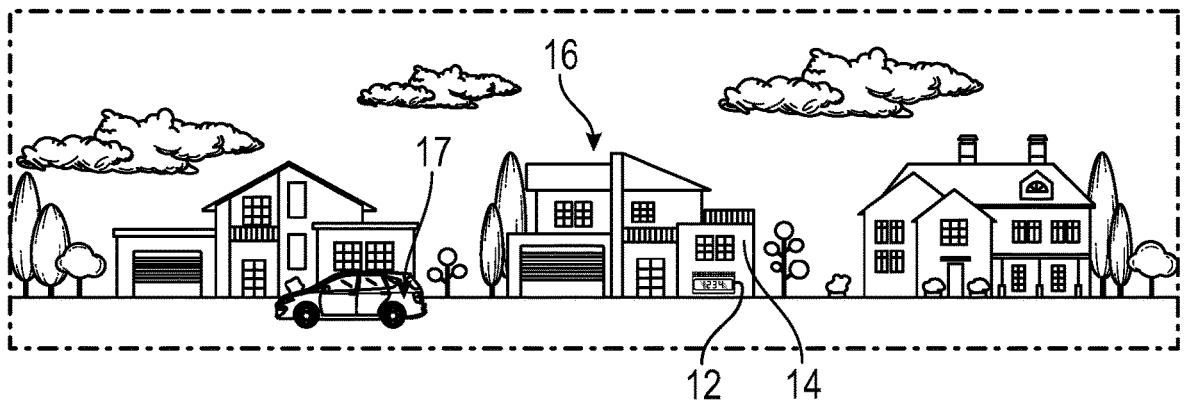
FIG. 6 is a perspective in-use view of an embodiment of the disclosure.

With reference now to the drawings, and in particular to FIGS. 1 through 6 thereof, a new sign device embodying the principles and concepts of an embodiment of the disclosure and generally designated by the reference numeral 10 will be described.

As best illustrated in FIGS. 1 through 6, the electronic sign assembly 10 generally comprises a display panel 12 that is mountable to an exterior wall 14 of a house 16 or other type of occupancy. In this the display panel 12 is visible to an individual 17 approaching the house 16. The individual 17 may be a delivery driver, an emergency responder or any other person traveling to the house 16. The display panel 12 has a front side 18, a back side 20 and a top side 22 and the display panel 12 has a pair of mounting holes 24 each extending through the back side 20. Each of the mounting holes 24 has a first portion 26 comprising a circle and a second portion 28 comprising a lobe extending downwardly from the circle. The first portion 26 insertably receives a head 30 of a fastener 32 and the second portion 28 inhibits the head 30 from passing through the second portion 28.

A solar panel 34 is hingedly coupled to the display panel 12 wherein the solar panel 34 is configured to be exposed to sunlight. The solar panel 34 has a bottom side 36 and a forward side 38 and a rear edge 40 of the bottom side 36 is hingedly coupled to a back edge 42 of the top side 22 of the display panel 12. The solar panel 34 is positionable in a deployed position having the bottom side 36 resting on the top side 22. Conversely, the solar panel 34 is positionable in a stored position having the solar panel 34 resting against the back side 20 of the display panel 12.

A display 44 is mounted to the display panel 12 such that the display 44 is visible to the individual 17 approaching the house 16. The display 44 displays indicia 46 comprising the numerical street address of the house 16 to facilitate the individual 17 to identify the address of the house 16. The display 44 is disposed on the front side 18 of the display panel 12 and the display 44 may comprise a liquid crystal display or other type of electronic display 44. A keyboard 48 is integrated into the display panel 12 and the keyboard 48 is in communication with the display 44 thereby facilitating the keyboard 48 to program the display 44 to display chosen numbers and letters which correspond to the address of the house 16. The keyboard 48 is integrated into the back side 20 of the display panel 12, the keyboard 48 comprises a plurality of alphanumeric keys and the keyboard 48 may be a qwerty keyboard or the like. Furthermore, the display 44 may comprise a plurality of electronic displays that are spaced apart from each other and are distributed along a substantial length of the front side 18 of the display panel 12.

A communication unit 50 is integrated into the display panel 12 and the communication unit 50 is in communication with the display 44. The communication unit 50 is in remote communication with a wireless communication network 52 thereby facilitating the communication unit 50 to communicate with a personal electronic device 54 of the individual 17. The personal electronic device 54 may comprise a smart phone or other similar type of electronic device that has wireless communication capabilities and data storage capabilities. The communication unit 50 actuates the display 44 to display the indicia 46 when the personal electronic device 54 moves within a pre-determined delivery distance of the house 16. In this way the communication unit 50 ensures the individual 17 can clearly identify the house 16 as the delivery destination. Additionally, the communication unit 50 de-actuates the display 44 after a pre-determined duration of time.

The communication unit 50 comprises a control circuit 56 that is integrated into the display panel 12 and the control circuit 56 is electrically coupled to the keyboard 48 and the display 44. The control circuit 56 receives an actuate input and the control circuit 56 receives a de-actaute input. The display 44 is actuated when the control circuit 56 receives the actuate input and the display 44 is de-actuated when the control circuit 56 receives the de-actuate input. The communication unit 50 includes an electronic timer 58 that is integrated into the display panel 12 and the electronic timer 58 is electrically coupled to the control circuit 56. The electronic timer 58 is actuated to countdown a predetermined duration of time when the control circuit 56 receives the actuate input. Furthermore, the control circuit 56 receives the de-actuate input when the electronic timer 58 counts down the predetermined duration of time. The pre-determined duration of time may be approximately 30.0 minutes.

The communication unit 50 includes a transceiver 60 that is integrated into the display panel 12 and the transceiver 60 is electrically coupled to the control circuit 56. The transceiver 60 is in wireless communication with the wireless communication network 52 thereby facilitating the transceiver 60 to be in communication with the personal electronic device 54. The personal electronic device 54 stores a delivery application 61 that is in communication with a global positioning system 62. The transceiver 60 may comprise a radio frequency transceiver or the like and the wireless communication network 52 may include, but not be limited, the internet or a cellular phone network.

The transceiver 60 receives a delivery command from the personal electronic device 54 when the individual 17 enters the address of the house 16 into the delivery application 61. Furthermore, the control circuit 56 is actuated into a standby condition when the transceiver 60 receives the delivery command. The transceiver 60 receives an alert command when the personal electronic device 54 moves within a pre-determined trigger distance of the house 16 as determined by the global positioning system 62. Additionally, the control circuit 56 receives the alert input when the transceiver 60 receives the alert command. The pre-determined distance may be a distance ranging between 300.0 meters and 400.0 meters.

A power supply 64 is integrated into the display panel 12 and the power supply 64 is electrically coupled to the control circuit 56. The power supply 64 comprises a rechargeable battery 66 that is integrated into the display panel 12 and the rechargeable battery 66 is electrically coupled to the control circuit 56. The power supply 64 includes a plurality of solar cells 68 and each of the solar cells 68 is integrated into the forward side 38 of the solar panel 34. In this way each of the plurality of solar cells 68 can be exposed to sunlight when the solar panel 34 is in the deployed position. Additionally, each of the plurality of solar cells 68 is electrically coupled to the rechargeable battery 66 for charging the rechargeable battery 66.

In use, the solar panel 34 is positioned in the deployed position, the keyboard 48 is manipulated to program the numerical street address into the display 44 and the display panel 12 is mounted to the exterior wall 14 of the house 16. The individual 17 programs the address of the house 16 into the delivery application 61 stored in the personal electronic device 54 when the individual 17 receives a delivery order. The display 44 is turned on when the individual 17 moves within the pre-determined trigger distance of the house 16 thereby facilitating the individual 17 to clearly see the address of the house 16. In this way the individual 17 can easily identify the destination for the delivery even at nighttime. Furthermore, the display 44 is turned off when the pre-determined duration of time has elapsed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic sign assembly being mountable to a house for displaying the address of the house in a highly visible manner to assist delivery drivers and emergency responders to identify the house, said assembly comprising:
   a display panel being mountable to an exterior wall of a house wherein said display panel is configured to be visible to an individual approaching the house, said display panel having a front side, a back side and a top side;
   a solar panel being hingedly coupled to said display panel wherein said solar panel is configured to be exposed to sunlight;
   a display being mounted to said display panel wherein said display is configured to be visible to the individual approaching the house, said display displaying indicia comprising the street address of the house wherein said display is configured to facilitate the individual to identify the address of the house;
   a keyboard being integrated into said display panel, said keyboard being in communication with said display thereby facilitating said keyboard to program said display to display chosen numbers and letters which correspond to the address of the house; and
   a communication unit being integrated into said display panel, said communication unit being in communication with said display, said communication unit being in remote communication with a wireless communication network thereby facilitating said communication unit to communicate with a personal electronic device of a delivery driver, said communication unit actuating said display to display said indicia when said personal electronic device moves within a pre-determined delivery distance of the house wherein said communication unit is configured to ensure the delivery driver can clearly identify the house as the delivery destination, said communication unit de-actuating said display after a pre-determined duration of time; and
   said solar panel having a bottom side and a forward side, a rear edge of said bottom side being hingedly coupled to a back edge of said top side of said display panel, said solar panel being positionable in a deployed position having said bottom side resting on said top side, said solar panel being positionable in a stored position having said solar panel resting against said back side of said display panel.

2. The assembly according to claim 1, further comprising said display panel having a pair of mounting holes each extending through said back side, each of said mounting holes having a first portion comprising a circle and a second portion comprising a lobe extending downwardly from said circle wherein said first portion is configured to insertably receive a head of a fastener and said second portion is configured to inhibit the head from passing through said second portion.

3. The assembly according to claim 1, wherein said communication unit comprises a control circuit being integrated into said display panel, said control circuit being electrically coupled to said keyboard and said display, said control circuit receiving an actuate input, said control circuit receiving a de-actaute input, said display being actuated when said control circuit receives said actuate input, said display being de-actuated when said control circuit receives said de-actuate input.

4. The assembly according to claim 3, wherein said communication unit includes an electronic timer being integrated into said display panel, said electronic timer being electrically coupled to said control circuit, said electronic timer being actuated to countdown a predetermined duration of time when said control circuit receives said actuate input, said control circuit receiving said de-actuate input when said electronic timer counts down said predetermined duration of time.

5. The assembly according to claim 3, wherein said communication unit includes a transceiver being integrated into said display panel, said transceiver being electrically coupled to said control circuit, said transceiver being in wireless communication with said wireless communication network thereby facilitating said transceiver to be in communication with said personal electronic device.

6. The assembly according to claim 5, wherein said personal electronic device stores a delivery application 61 being in communication with a global positioning system, said transceiver receiving a delivery command from said personal electronic device when the delivery driver enters the address of the house into said delivery application 61, said control circuit being actuated into a standby condition when said transceiver receives said delivery command.

7. The assembly according to claim 6, wherein said transceiver receives an alert command when said personal electronic device moves within a pre-determined trigger distance of the house as determined by the global positioning system, said control circuit receiving said alert input when said transceiver receives said alert command.

8. The assembly according to claim 3, further comprising a power supply being integrated into said display panel, said power supply being electrically coupled to said control circuit, said power supply comprising:
   a rechargeable battery being integrated into said display panel, said rechargeable battery being electrically coupled to said control circuit; and
   a plurality of solar cells, each of said solar cells being integrated into a forward side of said solar panel wherein each of said plurality of solar cells is configured to be exposed to sunlight when said solar panel is in a deployed position, each of said plurality of solar cells being electrically coupled to said rechargeable battery for charging said rechargeable battery.

9. An electronic sign assembly being mountable to a house for displaying the address of the house in a highly visible manner to assist delivery drivers and emergency responders to identify the house, said assembly comprising:
   a display panel being mountable to an exterior wall of a house wherein said display panel is configured to be visible to an individual approaching the house, said display panel having a front side, a back side and a top side, said display panel having a pair of mounting holes each extending through said back side, each of said mounting holes having a first portion comprising a circle and a second portion comprising a lobe extending downwardly from said circle wherein said first portion is configured to insertably receive a head of a fastener and said second portion is configured to inhibit the head from passing through said second portion;
   a solar panel being hingedly coupled to said display panel wherein said solar panel is configured to be exposed to sunlight, said solar panel has a bottom side and a forward side, a rear edge of said bottom side being hingedly coupled to a back edge of said top side of said display panel, said solar panel being positionable in a deployed position having said bottom side resting on said top side, said solar panel being positionable in a stored position having said solar panel resting against said back side of said display panel;

a display being mounted to said display panel wherein said display is configured to be visible to the individual approaching the house, said display displaying indicia comprising the street address of the house wherein said display is configured to facilitate the individual to identify the address of the house, said display being disposed on said front side of said display panel;

a keyboard being integrated into said display panel, said keyboard being in communication with said display thereby facilitating said keyboard to program said display to display chosen numbers and letters which correspond to the address of the house, said keyboard being integrated into said back side of said display panel, said keyboard comprising a plurality of alphanumeric keys;

a communication unit being integrated into said display panel, said communication unit being in communication with said display, said communication unit being in remote communication with a wireless communication network thereby facilitating said communication unit to communicate with a personal electronic device of a delivery driver, said communication unit actuating said display to display said indicia when said personal electronic device moves within a pre-determined delivery distance of the house wherein said communication unit is configured to ensure the delivery driver can clearly identify the house as the delivery destination, said communication unit de-actuating said display after a pre-determined duration of time, said communication unit comprising:

a control circuit being integrated into said display panel, said control circuit being electrically coupled to said keyboard and said display, said control circuit receiving an actuate input, said control circuit receiving a de-actaute input, said display being actuated when said control circuit receives said actuate input, said display being de-actuated when said control circuit receives said de-actuate input;

an electronic timer being integrated into said display panel, said electronic timer being electrically coupled to said control circuit, said electronic timer being actuated to countdown a predetermined duration of time when said control circuit receives said actuate input, said control circuit receiving said de-actuate input when said electronic timer counts down said predetermined duration of time; and a transceiver being integrated into said display panel, said transceiver being electrically coupled to said control circuit, said transceiver being in wireless communication with said wireless communication network thereby facilitating said transceiver to be in communication with said personal electronic device, said personal electronic device storing a delivery application 61 being in communication with a global positioning system, said transceiver receiving a delivery command from said personal electronic device when the delivery driver enters the address of the house into said delivery application 61, said control circuit being actuated into a standby condition when said transceiver receives said delivery command, said transceiver receiving an alert command when said personal electronic device moves within a pre-determined trigger distance of the house as determined by the global positioning system, said control circuit receiving said alert input when said transceiver receives said alert command; and a power supply being integrated into said display panel, said power supply being electrically coupled to said control circuit, said power supply comprising:

a rechargeable battery being integrated into said display panel, said rechargeable battery being electrically coupled to said control circuit; and a plurality of solar cells, each of said solar cells being integrated into said forward side of said solar panel wherein each of said plurality of solar cells is configured to be exposed to sunlight when said solar panel is in said deployed position, each of said plurality of solar cells being electrically coupled to said rechargeable battery for charging said rechargeable battery.

\* \* \* \* \*